ELECTRICAL INFORMATION STORAGE SYSTEM

Filed April 29, 1955 3 Sheets-Sheet 1

INVENTOR.
KENNETH C. PERKINS
BY Walter J. Kreske
ATTORNEY

INVENTOR.
KENNETH C. PERKINS
BY Walter J. Kreske
ATTORNEY

ELECTRICAL INFORMATION STORAGE SYSTEM

Filed April 29, 1955 3 Sheets-Sheet 3

INVENTOR.
KENNETH C. PERKINS
BY Walter J. Kreske
ATTORNEY

United States Patent Office 3,003,139

Patented Oct. 3, 1961

3,003,139

ELECTRICAL INFORMATION STORAGE SYSTEM

Kenneth C. Perkins, Lynnfield, Mass., assignor to General Electronic Laboratories, Inc., Cambridge, Mass., a corporation of Massachusetts Filed Apr. 29, 1955, Ser. No. 504,814
9 Claims. (Cl. 340—174)

This invention relates to electrical information storage systems and particularly to magnetic memory core systems wherein the stored information may be read repetitively any desired number of times without being destroyed.

In the past, magnetic core type information storage systems have necessitated by their method of operation, the destruction of the information stored therein whenever the stored information was read from the system. Thus, any information stored in the system was capable of giving only one reference reading. In those applications where it was desirable to make use of the stored information more than a single time, it was necessary to insert the same information into the system after each reading. Such an arrangement is cumbersome and inadequate for applications requiring more than a single reference to the stored information.

Pursuant to the present invention, an information storage system has been devised wherein the stored information may be retained for ready reference without being impaired, regardless of the number of times the stored information has been read therefrom. Therefor, a primary object of the present invention is the provision of a non-destructive readout, magnetic memory core information storage system.

Another object is the provision of a system in which information may be stored for long periods of time without loss or impairment.

A further object is the provision of a system which may be readily cleared of old information when desired.

Still another object is the provision of a system into which new information may be readily inserted for storage and ready reference.

A still further object is the provision of a system for the storage of information which lends itself to ready expansion to accommodate increased quantities of information.

Another object is the provision of a system using binary coded words with a minimum of circuitry required to reach individual digits of selected words in the system.

Another object of the present invention is the provision of a system which may be operated with relatively small current values and which thereby achieves relatively simple and inexpensive power supply equipment for driving information and other operating currents through the system.

These objects, features and advantages are achieved generally by providing a magnetic core with a substantially square hysteresis loop characteristic for each of the digits in the system, a writing circuit arrangement inductively coupled to the core for selectively changing the magnetic state of the core to a maximum residual state in one direction or to approximately ⅔ maximum residual state in the opposite direction to designate a "zero" and a "one" respectively in binary code in the core, a clearing circuit inductively coupled to the core for changing the magnetic state of the core to a maximum residual state in said opposite direction to provide a cleared condition for the core, and a reading circuit arrangement inductively coupled to the core having approximately the flux changing strength of the write "one" circuit arrangement for reading excitation of the core, and a sensing circuit inductively coupled to the core for determining the core response to the reading excitation.

By making the writing circuit arrangement in the form of two circuits inductively coupled to the core with each circuit carrying half the required ampere turns for changing the magnetic state to a maximum in the one direction, one of the circuits may thereby be used for the dual purpose of both assisting in the writing operation as well as the reading operation.

By providing a reference core similar to the memory core and adapting it in the circuit to be in a maximum residual magnetic state in the one direction and comparing response from the reference core due to reading excitation with the response from the information core from the same reading excitation, noise factors are minimized and information readings are enhanced.

By providing each end of the clearing, writing and reading circuits with grid-controlled electron-tube driver circuits simultaneously triggered by control pulses, positive control of the magnetic state of the core of each digit is assured.

By making one of the grid-controlled electron-tubes a pentode having a constant current characteristic over a wide range of voltages in the driving circuit, close control of reading, writing and clearing currents is achieved. By grounding the output end of the other grid controlled electron tube through a diode, the maintenance of a stable potential in the respective line is achieved.

By using word groups and providing a single input line for the clearing circuit and single input line for the writing circuit running to the corresponding word of each of the groups and providing one return line for all the words in a single group, additional word groups may be added as desired by merely adding an additional return line for the added word group. This utilizes the existing input lines and thereby permits additions for adaptation to increased information requirements with minimum increases in circuits required.

By providing a differential sensing electron tube arrangement operating substantially as a cathode follower for comparing reference core output with information core output, a relatively simple arrangement for obtaining positive information readings from the memory cores is achieved.

These and other features, objects and advantages of the present invention will become more apparent from the following description taken in connection with the accompanying drawings of an exemplary embodiment of the invention wherein.

Figure 1:
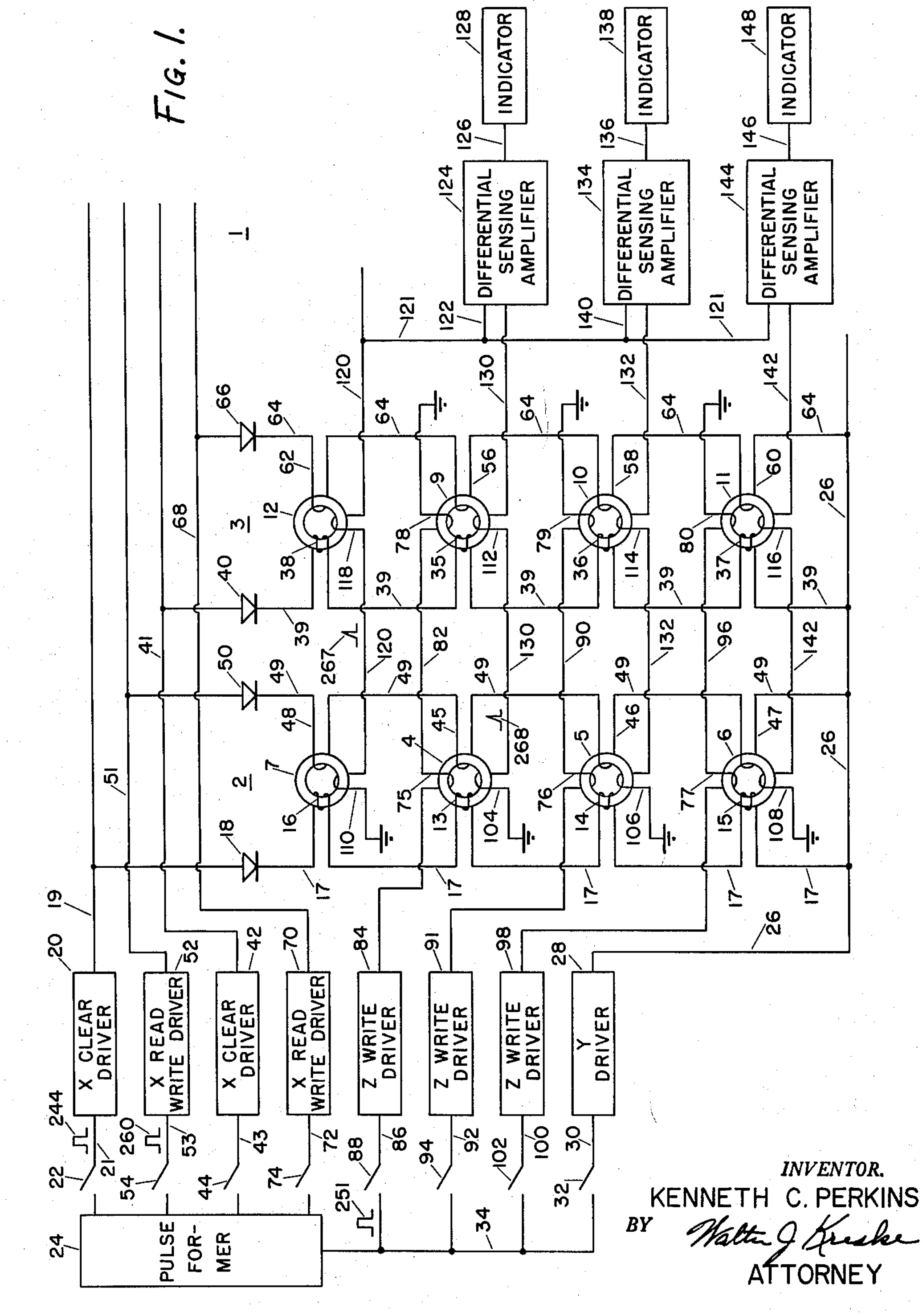
FIG. 1 is a partly schematic and partly block diagram showing an information storage system operating with two words of three digits each.

Referring to FIG. 1, the exemplary magnetic memory core information storage system is designated generally by the numeral 1. The information storage system 1 contains words 2 and 3. The word 2 is comprised of three magnetic memory cores 4, 5 and 6, each representing a digit in the word 2. It also contains a magnetic reference core 7. The cores 4, 5, 6 and 7 are similar and embody a square type hysteresis loop characteristic such as shown by the curve 8 in FIG. 6 where the H axis represents the magnetic field intensity and the vertical B axis the flux density.

The word 3 also consists of three magnetic cores 9, 10, and 11, each representing one digit in the word 3. The word 3 also has a reference core 12. The cores 9, 10, 11 and 12 are preferably the same as the cores in the word 2. By way of example, a core found suitable for the present embodiment is of toroidal shape commercially designated as Ferramic type S-1, Die size F-303 which is available from the General Ceramics Corp. While this core has been found suitable for the present embodiment other types and sizes of magnetic cores may also be used for this purpose.

Figure 2:
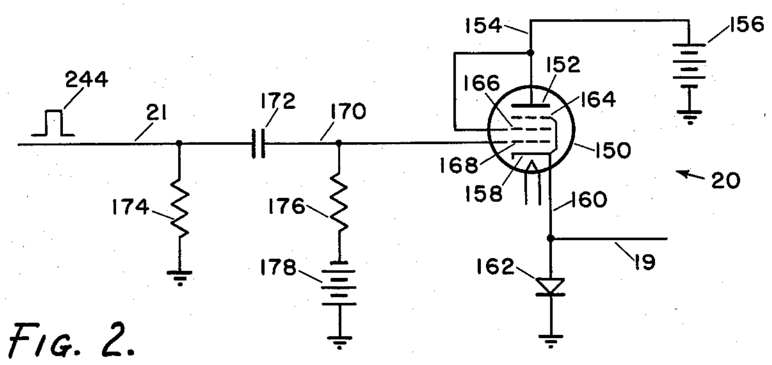
FIG. 2 is a schematic diagram of an X driver circuit suitable for use in the system disclosed in FIG. 1.

All of the cores 4, 5, 6 and 7 in the word 2 have inductive windings 13, 14, 15 and 16 respectively connected in series by a line 17. The line 17 is connected at one end through a unidirectional current valve as a crystal 18 and a line 19 to one side of an information clearing X driver circuit 20. The othre side of the X driver 20 is connected by a line 21 through a normally open switch 22 to a pulse former 24. A suitable X driver circuit 20 is shown in FIG. 2 which will be hereinafter more fully described. The pulse former 24 may be a conventional pulse forming circuit, preferably with a square type pulse as will be hereinafter described.

The other end of the line 17 is connected through a line 26 to one side of a Y driver circuit 28, the other side of which is connected through a line 30 and normally open switch 32 and a line 34 to the pulse former 24.

Similarly the magnetic cores 9, 10, 11 and 12 in the word 3 have inductive windings 35, 36, 37 and 38 respectively connected in series by a line 39. All of the inductive windings 13, 14, 15, 16, 35, 36, 37 and 38 are preferably the same in that they have the same number of turns, however, the windings 16 and 38 on the reference cores 7 and 12 are wound in the opposite direction to the windings 13, 14, 15, 35, 36 and 37 on the respective memory cores for reasons to be hereinafter explained.

One end of the line 39 is connected through a unidirectional current device as a crystal 40 which may be similar to crystal 18 to a line 41. The line 41 is connected to one side of a clearing X driver circuit 42, the other side of which is connected through a line 43 and a normally open switch 44 to the pulse former 24. The clearing X driver 42 may be similar to the X driver 20.

The other end of the line 39 is connected to the line 26 in similar manner to the line 17.

Each of the cores 4, 5, 6 and 7 in the word 2 is provided with another inductive winding 45, 46, 47 and 48 respectively. The windings 45, 46, 47 and 48 in the present embodiment, have half the number of turns of the windings 13, 14, 15, and 16 in order to provide half the ampere turn value of the windings 13, 14, 15 and 16. Also, the windings 45, 46, 47 and 48 are wound upon the respective cores in the opposite direction from that of the windings 13, 14 and 15.

The windings 45, 46, 47 and 48 are connected in series by a line 49, one end of which is connected through a unidirectional current device as crystal 50 and a line 51 to one side of a read-write X driver circuit 52, the other side of which is connected through a line 53 and a normally open switch 54 to the pulse former 24. The X driver 52 may be similar to the X driver 20. The other end of the line 49 is connected to the line 26 in manner similar to the line 17.

In similar manner, the cores 9, 10, 11 and 12 of the word 3 are each provided with another inductive winding 56, 58, 60 and 62 respectively, having half the number of turns as the windings 35, 36, 37 and 38 to provide half the ampere turn value of the latter windings. The windings 56, 58, 60 and 62 are also wound about the respective cores in the opposite direction to that of the windings 35, 36 and 37. The windings 56, 58, 60 and 62 are connected in series by a line 64, one end of which is connected through a unidirectional current device such as a crystal 66 similar to the crystal 18 and a line 68 to one side of a read-write X driver 70, the other side of which is connected through a line 72 and a normally open switch 74 to the pulse former 24. The other end of the line 64 is connected to the line 26 in similar manner to the line 17.

Each of the digit memory cores 4, 5, 6, 9, 10 and 11 is supplied with a third winding 75, 76, 77, 78, 79 and 80 respectively. Each of the windings 75, 76, 77, 78, 79 and 80 has the same number of turns and is wound in the same sense as the windings 45, 46, 47, 56, 58 and 60. The windings 75 and 78 are connected in series by a line 82, one end of which is connected to one side of a Z write driver 84, the other side of which is connected through line 86 and a normally open switch 88 to the line 34. The other end of the line 82 is connected to ground.

The windings 76 and 79 are connected in series by a line 90, one end of which is connected to one side of a Z write driver 91, the other side of which is connected through a line 92 and a normally open switch 94 to the line 34. The other end of the line 90 is connected to ground. The Z write driver 91 may be similar to the Z write driver 84 and the Y driver 28, to be hereinafter described.

The windings 77 and 80 are connected in series by a line 96, one end of which is connected to one side of a Z write driver 98, the other side of which is connected through a line 100 and a normally open switch 102 to the line 34. The other end of the line 96 is connected to ground. The Z write driver 98 may be similar to Z write driver 91 and Y driver 28.

It will be noted that the lines 82, 90 and 96 inductively couple the Z write driver circuits in series with the corresponding digit in each respective word in the system.

Figure 4:
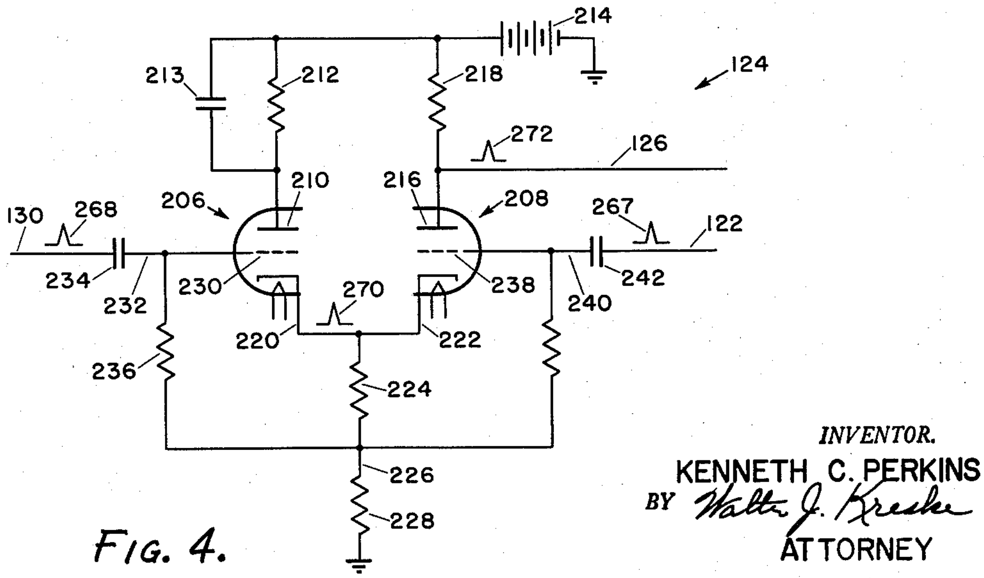
FIG. 4 is a schematic diagram of a differential sensing amplifier suitable for use in the system disclosed in FIG. 1.

Each of the magnetic cores 4, 5, 6, 7, 9, 10, 11 and 12 is also provided with a further inductive winding 104, 106, 108, 110, 112, 114, 116 and 118 respectively. Each of these windings is a sensing winding for the respective magnetic core. The windings 110, and 118 are connected in series by a line 120, one end of which is connected through a line 121 and a line 122 to one side of a differential sensing amplifier 124, the other side of which is connected through a line 126 to an indicator 128. A differential sensing amplifier circuit suitable for use at 124 is shown in FIG. 4 and will be hereinafter described. The indicator 128 may be any suitable indicator such as a neon glow tube arrangement. The other end of line 120 is connected to ground.

The sensing windings 104 and 112 are connected in series by a line 130, one end of which is connected to the differential sensing amplifier 124. The other end of line 130 is connected to ground.

The sensing windings 106 and 114 are connected in series by a line 132, one end of which is connected to a differential sensing amplifier 134. The differential sensing amplifier 134 is also connected through a line 136 to an indicator 138 such as the indicator 128. The line 121 is also connected to the differential sensing amplifier 134 by a line 140 in manner similar to that in the differential sensing amplifier 124. The other end of the line 132 is connected to ground.

The sensing windings 108 and 116 are connected in series by a line 142, one end of which is connected to a differential sensing amplifier 144 which in turn is connected through a line 146 to an indicator 148 similar to the indicators 128 and 138. The line 121 is also connected to the differential sensing amplifier 144. The other end of the line 142 is connected to ground.

It will be noted that the sensing lines 120, 130, 132 and 142 connect the sensing windings of the reference cores and of corresponding digits in the respective words in series.

Referring to FIG. 2, the X clearing driver circuit is designated generally by the numeral 20 (FIGS. 1 and 2). The X driver 20 has a beam tetrode 150 having an anode 152 connected through a line 154 to the positive terminal of a power source such as a battery 156, the negative terminal of which is connected to ground. The cathode 158 of the pentode 150 is connected through a line 160 and a unidirectional current device as a diode 162 to ground. A beam forming electrode 164 in the tetrode 150 is tied back to the cathode 158. The screen grid 166 is connected to the anode 152. Control grid 168 of the tetrode 150 is connected by a line 170 through a capacitor 172 to the line 21 (FIG. 1). Line 21 is connected through a leakage resistor 174 to ground. Line 170 leading to control grid is connected through a bias resistor 176 to a source of negative biasing potential such as the negative terminal of a battery 178, the positive terminal of which is connected to ground. The line 160 from the cathode 158 is connected to the line 19 (FIG. 1, FIG. 2). It will be noted that the X driver 20 is suitable for use as the X driver 52, 42, 70.

Figure 3:
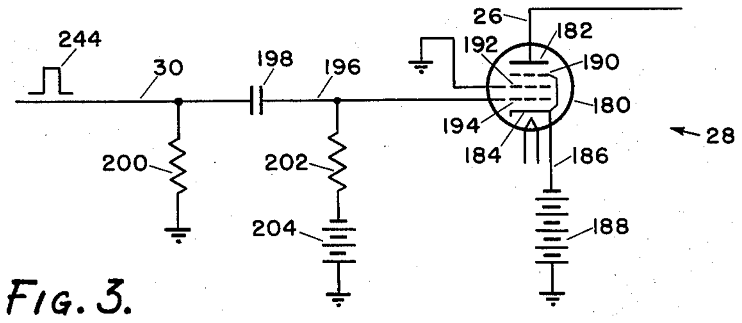
FIG. 3 is a schematic view of a Y and a Z driver circuit suitable for use in the system disclosed in FIG. 1.

In FIG. 3, the Y driver is shown generally by the numeral 28 (FIGS. 1 and 3). Y driver 28 has a pentode 180 having an anode 182 connected to the line 26 and a cathode 184 connected by a line 186 to the negative terminal of a power source such as a battery 188. A suppressor grid 190 of the pentode 180 is tied back to the cathode 184. Screen grid 192 is connected to ground. Control grid 194 is connected through a line 196 and a capacitor 198 to the line 30 (FIGS. 1 and 3). The line 30 is connected through a leakage resistor 200 to ground. Line 196 is connected through a bias resistor 202 to a negative biasing potential source such as the negative terminal of a battery 204, the positive terminal of which is connected to ground. The Y driver 28 is also suitable for use as the Z driver 84, 91 and 98.

A differential sensing amplifier circuit suitable for use in FIG. 1 is designated generally in FIG. 4 by the numeral 124 (FIGS. 1 and 4). The differential sensing amplifier 124 has two triodes 206 and 208 which may be in a single envelope. The triode 206 has an anode 210 connected through a parallel connected resistor 212 and capacitor 213 to the positive terminal of a potential power source such as a battery 214, the negative terminal of which is connected to ground. Similarly, anode 216 of the triode 208 is connected through a resistor 218 to the positive terminal of battery 214. Cathode 220 of the triode 206 and cathode 222 of the triode 208 are connected through a common resistor 224, line 226 and a resistor 228 to ground. Control grid 230 of the triode 206 is connected through a line 232 and a capacitor 234 to the line 130 (FIGS. 1 and 4). Line 232 is connected through a resistor 236, the line 226 and resistor 228 to ground.

Control grid 238 in the triode 208 is connected through a line 240 and a capacitor 242 to the line 122 (FIGS. 1 and 4). The line 126 (FIGS. 1 and 4) leading to indicator 128 is connected to the anode 216 of the triode 208.

Figure 6:
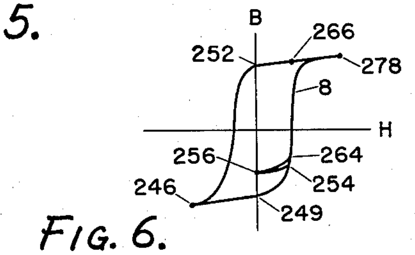
FIG. 6 is a diagram showing a representative hysteresis loop characteristic in the magnetic memory cores used in FIG. 1.

In operation, to clear the magnetic cores in the word 2, the normally open switches 22 and 32 are closed. This causes a positive biasing pulse 244 from the pulse former 24 to appear simultaneously through line 21, capacitor 172 and line 170 at the control grid 168 of the pentode 150 (FIGS. 1 and 2) and through line 34, line 30, capacitor 198, line 196 at the control grid 194 of the pentode 180 (FIGS. 1 and 3) in the X clearing driver 20 and the Y driver 28 respectively. Pulse 244 is of an amplitude such as will drive the control grids 168 and 194 positive to make the pentodes 150 and 180 sufficiently conductive to cause current to flow through line 19, crystal 18, line 17, series windings 16, 13, 14 and 15, and line 26. Pulse 244 is designed to have a sufficient voltage magnitude to cause the current magnitude in the windings 16, 13, 14 and 15 to drive the digit cores 4, 5 and 6 respectively to saturation in one direction represented by the point 246 on the hysteresis curve 8 (FIG. 6). This driving effect is a function of the ampere turns in the respective windings and for this clearing operation may be designated by the magnetic intensity curve portion 248 (FIG. 7) which corresponds in duration to the current pulse caused by the voltage pulse 244 (FIG. 1). At the termination of the pulse 244, the clearing current in line 17 will drop to zero shown at 250 on the magnetic intensity curve in FIG. 7 and the residual magnetic state of the digit cores 4, 5 and 6 will be at a maximum as represented by the point 249 on the hysteresis curve 8 in FIG. 6. It will be noted that whereas the memory cores 4, 5 and 6 are left thereby in a magnetic state designated by the point 249, the reference core 7 will by the same pulse 244 have been placed in a maximum residual magnetic state having an opposite direction and designated by the point 252 on the hysteresis curve 8. The reason for this is that the winding 16 on the reference core 7 is wound in the opposite sense from the windings 13, 14 and 15 respectively.

While a single pulse 244 is sufficient to place the memory cores in the cleared condition just described, the occurrence of several clearing pulses 244 in the clearing operation are not harmful in that the cleared residual state of the cores will still remain the same.

Upon clearing the cores as described above, the switches 22 and 32 are opened and the word 2 is then ready for the writing operation is performed in binary code. Thus each core represents a digit in the code and the information at each digit may be designated as a "zero" or a "one" depending upon the magnetic state of the core. Two different and distinct magnetic states for the memory cores have been found desirable for use in the present nondestructive read-out system. They are arbitrarily labeled herein as the "one" state and the "zero" state.

For example, to write a "one" in the core 4, the switch 54 and the switch 32 are closed. This will cause a pulse 260 (FIG. 1) similar to pulse 244 to appear simultaneously at the control grid of the X driver 52 and the control grid 194 of the Y driver 28 to thereby cause a current to flow in the winding 45 in similar manner to that explained above for the clearing operation. Since the X driver 52 is the same as the X driver 20, the current in the winding 45 will be substantially of the same magnitude as that previously in the winding 13. However, the winding 45 having ½ the number of turns as the winding 13, the magnetic intensity created thereby will be of approximately ½ the value of that caused by the current in the winding 13. Because the winding 45 is wound in the opposite direction to winding 13, this magnetic intensity will also be in a direction opposite to that created by the current in winding 13 and is shown by the flat portion 253 of the magnetic intensity curve in FIG. 7. This magnetic intensity will change the magnetic state of the core 4 from its residual maximum designated by the point 249 (FIG. 6) to some intermediate point 254 on the steep portion of the hysteresis curve 8. Upon the termination of the writing pulse 260, the magnetic state of the core 4 will fall back to a state of magnetism designated approximately by point 256 at zero magnetic intensity corresponding to the portion 258 of the curve in FIG. 7.

It has been found that more than two pulses 260 will not materially change the residual magnetic state of the core 4 from the position 256. Having written the "one" in the core 4, the switch 54 is opened and the "one" information in the core 4 is stored therein ready for repetitive reading without destruction of the stored "one."

To read the information in the core 4, switch 54 and switch 32 (FIG. 1) are again closed to thereby cause a reading pulse which is identical to the pulse 260 to simultaneously appear at the control grids in the X driver 52 and the Y driver 28 respectively and thereby cause a current to flow through the winding 48 of the reference core 7 and the winding 45 of the information core 4 in the same manner as described with regard to writing "one" above. The magnetic intensity caused by the current from the reading pulse is shown by the portion 262 of the magnetic intensity curve in FIG. 7. During the flow of this reading current, the magnetic state of core 4 will follow a path substantially from point 256 to a point 264 on the hysteresis curve 8. The reference core which has been in a residual magnetic state designated by the point 252 from the previously mentioned clearing pulse will follow the flat portion of the hysteresis loop 8 to a point 266. Since the reference core 7 follows a path from 252 to 266 which is substantially flat, there is very little change in magnetic flux caused thereby in the core 7. Therefor, there will be very little induced voltage in the sensing winding 110. Thus only a very small biasing voltage pulse 267 (FIGS. 1 and 4) will occur through lines 120, 121 and 122 at the control grid 238 in the triode 208 (FIG. 4).

On the other hand, the magnetic state of the core 4 will pass from the point 256 to the point 264 on the hysteresis curve 8. This will cause a flux change substantially larger than that of the reference core described above. This change in the magnetic state of core 4 will induce a voltage pulse 268 (FIGS. 1 and 4) in the line 130. The pulse 268 will appear at the control grid 230 of the triode 206 (FIG. 4) and will cause a similar pulse 270 to appear at cathode 220. Since the cathode 220 is connected by a common line to the cathode 222, the pulse 270 will appear at the cathode 222 also. The simultaneous appearance of pulse 270 at cathode 222 and the small pulse 267 at the control grid 238 will result in a pulse 272 at the anode 216 and thereby in the output line 126 running to the indicator 128. The pulse 272 will have an amplitude approximately equal to the difference between the pulse 268 and 267. If the indicator 128 used is a neon tube, the pulse 272 will make the neon tube glow to indicate the reading of a "one" from the memory core 4.

It will be noted that the reading of the "one" in the memory core 4 did not change the residual state of magnetism in the memory core 4 and therefor the "one" remains stored therein for as many similar future readings of the memory core 4 as may be desired. The magnetic state of the memory core 4 will vary between points 256 and 264 (FIG. 6) on the hysteresis curve 8 during subsequent read pulses and may be designated by the portion 273 on the magnetic intensity curve in FIG. 7.

Figure 7:
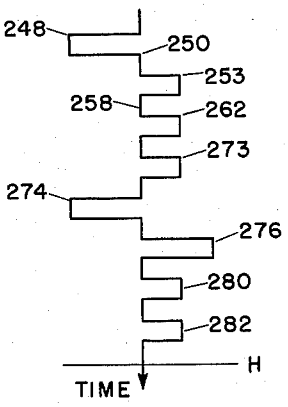
FIG. 7 is an illustrative curve of magnetic field intensity versus time for use with the hysteresis curve in FIG. 6 to more clearly illustrate the operation of the embodiment disclosed in FIG. 1.

If it becomes desirable to write a "zero" into the memory core 4, the core 4 is first cleared by a pulse 244 as explained above to produce a corresponding clearing cycle designated by the numeral 274 on the magnetic intensity curve in FIG. 7 and similar to the cycle 248 explained above.

After this clearing operation, the residual state of the memory core 4 will again have a direction and magnitude corresponding to the point 249 on the hysteresis curve 8 in FIG. 6. To write the "zero" into the memory core 4, the three switches 54, 88 and 32 are closed (FIG. 1). The closing of switch 88 will cause a voltage pulse 251 similar to pulse 244 to appear at the control grid in the Z driver 84 and thereby a corresponding current pulse to flow through the winding 75. Similarly closing of switches 54 and 32 causes simultaneous current pulse through the winding 45 on the core 4. The windings 75 and 45 have substantially the same number of turns and are wound on the core 4 in the same sense. The current through the respective winding 75 and 45, thereby, have a cumulative effect upon the memory core 4 such as to create a magnetic intensity cycle 276 on the magnetic intensity curve in FIG. 7. This write "zero" cycle magnetic intensity is sufficient to drive the memory core 4 to saturation in the positive direction indicated by the point 278 on the hysteresis curve 8 in FIG. 6. After the write "zero" pulses in the windings 75 and 45, the core 4 will be left with a residual state of magnetism indicated by point 252 on the hysteresis curve 8 in FIG. 6. This residual magnetic state in the memory core 4 is the "zero" information state. The switches 54, 88 and 32 may then be opened to leave this "zero" information stored in the memory core 4.

Reading the "zero" from the core 4 is performed in a similar manner to reading the stored "one" from the core 4 as explained above. That is, by closing the switch 54 and the switch 32 to cause thereby a reading pulse similar to the pulse 260 to cause a reading current to pass through the winding 48 in the reference core 7 and through the winding 45 in the memory core 4. Since the magnetic state of the memory core 4 for a "zero" is the same as the magnetic state of the reference core 7, the reading pulse in the windings 48 and 45 will cause only similar small induced pulses in the sensing windings 110 and 104 (FIG. 1) respectively. These small induced voltage pulses will be of the same amplitude. One will appear at the cathode 222 in manner similar to that explained above with regard to the read "one" pulse 268. The other will appear at the control grid 238 in manner similar to the pulse 267 explained above. Since these pulses are of the same magnitude, they will tend to cancel each other so that there will be substantially no voltage change in the output line 126, and therefor, will cause no change in indication at the indicator 128. No change at the indicator 128 on the insertion of a read pulse, becomes indicative of the reading of a "zero" in the memory core 4.

With the "zero" residual magnetic state of the memory core 44 at the point 252 on the hysteresis curve 8, the read magnetic intensity change indicated at 280 in FIG. 7 causes the magnetic state of memory core 4 to change from point 252 along the flat portion of the hysteresis curve 8 to the point 266 and back to the point 252. Thus it is seen that the stored "zero" information remains unchanged and undestroyed in the memory core 4. Any subsequent read pulse indicated at 282 on the magnetic intensity curve in FIG. 7 may be repeated as often as desired without changing the stored "zero" information in the memory core 4.

In similar manner, the memory cores 5 and 6 may be cleared by closing the switch 22 and the switch 32. A "one" may be written into all of the memory cores 4, 5 and 6 simultaneously by closing the switch 54 and the switch 32. In those of the memory cores 4, 5 and 6 in which a "zero" is desired to be stored, each of the selected switches 88, 94 and 102 for the respective memory core selected is also closed at the same time that the switch 54 is closed. Thereby, as explained above, in those selected memory cores which have both a Z write and and X write driver switch closed will register a "zero" rather than a "one."

Likewise, after the desired information is stored in the memory cores 4, 5 and 6, this information may be read from these cores simultaneously at their respective indicators 128, 138 and 148 by closing the switches 54 and 32 to pass a reading pulse 260 through the windings 45, 46 and 47 on the memory cores.

Information may be stored and read from the word 3 in manner similar to that described with regard to the word 2, except that to select the word 3, the switches 44 and 74 are used in place of the switches 22 and 54.

Figure 5:
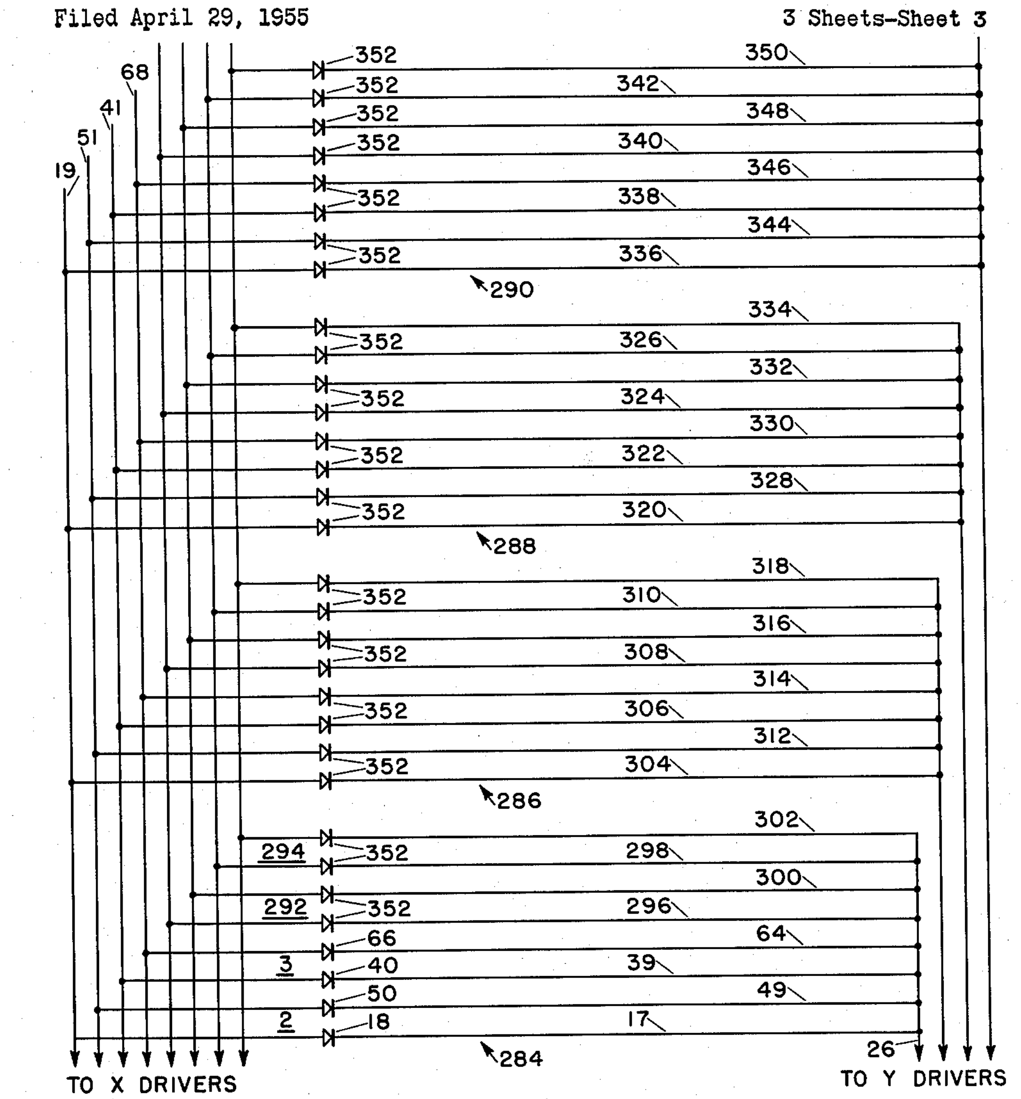
FIG. 5 is a diagram illustrating the applicability of the present invention to additions of word groups for increased informational requirements.

While in FIG. 1, for illustrative purposes, only two words 2 and 3 are shown, the present system is suited for an increased number of words with a minimum number of additional circuits involved. The circuit arrangement for increased number of words is shown schematically in FIG. 5 where the memory cores, the X, Y and Z drivers, the differential sensing amplifiers and indicators are omitted for clarity in showing the circuit arrangement. The corresponding lines for the two words shown in FIG. 1 appear in FIG. 5 at the left portion of the diagram. It will be noted that the system in the present invention utilizes individual word groups. Four such word groups 284, 286, 288 and 290 are represented in FIG. 5. The word group 284 contains four words of which the first two are the words 2 and 3 described with regard to FIG. 1 and also the words 292 and 294. Each word contains a pair of lines, one line for the clearing circuit such as line 17 in the word 2 and one line for the read-write circuit such as the line 49 in the word 2. Words 3, 292 and 294 in the word group 284 each have clearing lines 39, 296 and 298 respectively; and read-write lines 64, 300, and 302 respectively.

The word group 286, similarly, has clearing lines 304, 306, 308 and 310; and read-write lines 312, 314, 316 and 318. A pair of these lines is provided for each of the respective four words in the group. Similarly the word group 288 has clearing lines 320, 322, 324 and 326; and read-write lines 328, 330, 332 and 334 with a pair of these lines for each of the four words in the group. Likewise, the word group 290 has clearing lines 336, 338, 340 and 342, and read-write lines 344, 346, 348 and 350 with a pair of lines for each of the four words in the group.

All of the clearing and read-write lines have unidirectional current devices therein as crystals 18, 50, 40 and 66 in lines 17, 49, 39 and 64 respectively, to prevent stray currents reaching individual words. The remaining crystals in the respective lines are numbered 352 to indicate their similarity to each other and to crystals 18, 40 and 66.

It will be noted that each word group has a common Y driver. Thus the word group 284 has the common Y driver 28. On the other hand each word in a group has a separate X clear driver and a separate X read-write driver for the respective clearing and read-write line in the word. For example, the word 2 has the X clear driver 20 for the clearing line 17 and the X read-write driver 52 for the read-write line 49. Each of the other words in the group 284 has its own X clear driver and X read-write driver for the respective clearing and read-write lines.

But the successive word groups as 286, 288 and 290 may have their corresponding words in the group connected to the same X clear driver and the same X read-write drive. For example, the X clear driver 20 is common to the clearing line 17 in word 2 as well as the clearing lines 304, 320, and 336 in the first word of the respective word groups 284, 286 and 290. Likewise, the X read-write driver 52 is common to read-write lines 49, 312, 328 and 344 in the first word of each of the respective word groups 284, 286, 288 and 290. This arrangement succeeds in having a relatively large number of words with a relatively small number of X and Y drivers. Thus, it reduces the bulkiness as well as cost of the system and at the same time achieves easy accessibility to any selected word in any selected word group.

While FIG. 1 for illustrative purposes shows only three digits, a larger number of digits may be used. The number of digits in any word may be increased by adding an additional memory core with corresponding Z driver, differential sensing amplifier and indicator circuit for each of the added digits.

With the Ferramic type S–1 memory core described above, the present embodiment succeeds in operating with small currents such as 100 milliamperes through the respective read-write and clearing lines. To compensate for the diminutive size of the current, the respective memory and reference cores are wound for a one ampere turn for reading and two ampere turns for clearing. Thus in the word 2 the windings 16, 13, 14 and 15 have twenty turns each, while the windings 48, 45, 46, 47, 75, 76 and 77 have ten turns each. The sensing windings 110, 104, 106 and 108 have one turn each. By using this arrangement and diminutive currents, the driving circuitry is simplified in that only small currents are involved. However, this combination of currents and size of core, and number of turns in the windings are cited here for illustrative purposes only and may be varied to suit individual needs.

While the practical embodiment disclosed herein uses a maximum negative residual state in the magnetic core as the starting state from which both the "one" and the "zero" are written into the core, experimental results show that the residual state from which writing occurs need not be at the maximum value actually used. The starting value for writing need only be at a value below that which is used as the magnetic state indicating a "one." Also, the "one" magnetic state need only be any residual state below the maximum value assigned to the "zero."

What is claimed is:

1. In an electrical information storage system, a magnetic core, a substantially square hysteresis loop characteristic in said core, means inductively coupled to said core for creating in said core a maximum residual state of magnetism in one direction, means inductively coupled to said core for creating in said core a residual state of magnetism between zero and a maximum in said one direction, a second magnetic core having a square hysteresis loop characteristic and being in one of said last two mentioned residual states of magnetism, and electrical circuit means inductively coupled to said cores for comparing the residual state of magnetism in said first core to the residual state of magnetism in said second core.

2. An electrical information storage system comprising an array of magnetic core memory elements, said elements being arranged in digital word groups, each of the words in a word group including a reference element similar to the memory element, a clearing circuit inductively coupled to each of the elements in a word, a read-write circuit inductively coupled to each of the elements in a word, a writing circuit inductively coupled to the corresponding element of each respective word in each of the word groups, a sensing circuit inductively coupled to the corresponding element of each respective word in each of the word groups, and selective means for comparing the output of the sensing reference core circuit with the outputs of the respective digit sensing circuits in a selected word of one of the word groups.

3. In a magnetic memory system, a magnetic core, memory clearing means coupled to the core for driving said core to a preselected residual magnetic reference state of one polarity, a pair of writing and reading means coupled to said core, each for subjecting said core to a magnetic field intensity of opposite polarity from said one, the magnetic field intensity of each means of said pair separately being insufficient to change the polarity of said reference residual state and combined being of sufficient intensity to change said polarity, electrical signal output means inductively coupled to said core, electric reference signal means, and means coupled to said output and reference signal means for comparing the signals in said output and reference signal means.

4. In a magnetic memory system, a magnetic core, memory clearing means coupled to the core for driving said core to substantial saturation and a residual magnetic state of one polarity, a pair of writing and reading means coupled to said core, each for subjecting said core to a magnetic field intensity of opposite polarity from said one, the magnetic field intensity of each means of said pair separately being insufficient to change the polarity of said residual state and combined being of sufficient intensity to drive said core to substantial saturation and a residual magnetic state of an opposite polarity from said one, electric signal output means inductively coupled to said core, electric signal reference means, and means coupled to said output and reference signal means for comparing the signals in said output and reference signal means.

5. In a magnetic memory system, a magnetic core having a substantially square hysteresis loop characteristic, memory clearing means coupled to the core for driving the core to substantial saturation and a residual magnetic state of one polarity, a pair of writing and reading means coupled to said core, each for subjecting said core to a magnetic field intensity of opposite polarity from said one, the magnetic field intensity of each means of said pair separately being approximately one half the intensity required for driving said core to substantial saturation, electric signal voltage output means inductively coupled to said core, electric voltage signal reference means, means coupled to said output and reference signal means for determining the difference between said output and reference signal voltages, and means for indicating said difference.

6. In a magnetic memory system, a pair of magnetic cores, electric current means coupled to said cores for producing residual magnetism of known polarity in said cores, a pair of current means coupled to one of said cores and one of said pair coupled to the other core, each of said pair for subjecting said one core to a magnetic field intensity of opposite polarity from said known polarity, each of said pair separately being insufficient to change the polarity of the residual magnetism of said one core and combined being of sufficient intensity to change said polarity, electric signal output means inductively coupled to said cores, and means for comparing the signals in said output means.

7. In an apparatus for determining the polarity of residual magnetism in a magnetized core, the combination of a magnetized core and a magnetized reference core having substantially identical electrical characteristics to the first mentioned core and having a known polarity of magnetization, means for subjecting said magnetized core and magnetized reference core to a magnetic field intensity of preselected magnitude insufficient to change substantially the residual magnetic state of said cores, means coupled to said cores for abruptly removing said magnetic field intensity, voltage signal induction means coupled to each of said cores and voltage signal comparing means coupled to said induction voltage means for comparing the induced voltages therein.

8. A magnetic core having a square hysteresis loop characteristic, a voltage pulse former, a first, a second, a third and a fourth voltage controlled constant current drivers, each having an input and output terminals with the input terminal of each arranged for coupling to the pulse former, a first and a second electric circuits coupled to the output of said first and second drivers respectively and said third current driver, an inductive winding in said first circuit inductively coupled to said core for creating magnetic flux in said core in one direction in response to pulses from said voltage pulse former, an inductive winding in said second circuit inductively coupled to said core for creating magnetic flux in said core in the opposite direction in response to voltage pulses from said pulse former, a third circuit operatively connected to the output of the fourth current driver, an inductive winding in said third circuit inductively coupled to said core for creating a magnetic flux in said core in said opposite direction in response to voltage pulses from said pulse former, a fourth inductive winding inductively coupled to said core, means coupled to said fourth inductive winding for comparing voltages induced in said fourth inductive winding to a known reference voltage, and means coupled to said comparing means for indicating said comparison.

9. An electrical information storage system comprising a multiplicity of similar toroidal ferrite magnetic memory cores, each having a substantially square hysteresis loop characteristic and arranged into groups with each core representing a digit in the respective group, each of the groups including a reference core substantially identical to the digit cores, three inductive windings on each of the reference cores and four inductive windings on each of the digit cores, one of said windings on each core containing approximately twice the number of turns as each of the other of said windings and wound on the digit cores in a direction for creating flux opposed to that created by said other windings, a first circuit connecting said one winding in each core of a group for simultaneously clearing said cores in the group of stored information, a second circuit for each of the cores in the group connecting a second of said windings in each of the cores of the group for reading and writing information in said cores, a third circuit coupled to a fourth winding of a corresponding digit of each group for cooperating with said second winding circuit in writing information into selected ones of said corresponding digit cores, a sensing circuit for the corresponding cores of each of the groups, the respective sensing circuit coupled to the third winding of the corresponding core of each group, for sensing information in said cores in response to excitation from the reading circuit, means for selectively exciting the clearing, writing and reading circuits with electric current pulses, and means coupled to the reference and digit core sensing circuits for indicating the difference between the digit and reference core responses in said sensing circuits.

References Cited in the file of this patent

UNITED STATES PATENTS

| | | |
|---|---|---|
| 2,614,167 | Kamm | Oct. 14, 1952 |
| 2,691,154 | Rajchman | Oct. 5, 1954 |
| 2,740,949 | Counihan et al. | Apr. 3, 1956 |
| 2,774,056 | Stafford | Dec. 11, 1956 |
| 2,832,945 | Christensen | Apr. 29, 1958 |

OTHER REFERENCES

"Non-destructive Sensing of Magnetic Cores," by D. A. Buck and W. I. Frank, Communications and Electronics, pp. 822–830, January 1954.

"A New Non-destructive Read for Magnetic Cores," by R. Thorensen and W. R. Arsenault, pp. 111–116, 1955, Western Joint Computer Conference. Conference, March 1–3, 1955.